(12) United States Patent
Chen et al.

(10) Patent No.: US 11,939,264 B1
(45) Date of Patent: Mar. 26, 2024

(54) PREPARATION METHOD FOR HYDROTHERMAL SYNTHESIS OF FLY ASH SILICATE AGGREGATE

(71) Applicant: Henan Building Materials Research and Design Institute Co., Ltd., Zhengzhou (CN)

(72) Inventors: Shengqiang Chen, Zhengzhou (CN); Zhuhe Zhai, Zhengzhou (CN); Bing Zhang, Zhengzhou (CN); Linjian Shangguan, Zhengzhou (CN); Ruixiao Chen, Zhengzhou (CN); Luyang Li, Zhengzhou (CN); Ge Yang, Zhengzhou (CN); Ming Han, Zhengzhou (CN); Guowang Li, Zhengzhou (CN); Rui Yin, Zhengzhou (CN); Tingting Wang, Zhengzhou (CN); Yongchuan Liu, Zhengzhou (CN); Dan Chen, Zhengzhou (CN)

(73) Assignee: Henan Building Materials Research and Design Institute Co., Ltd., Zhengzhou (CN)

( * ) Notice: Subject to any disclaimer, the term of this patent is extended or adjusted under 35 U.S.C. 154(b) by 0 days.

(21) Appl. No.: 18/373,521

(22) Filed: Sep. 27, 2023

(30) Foreign Application Priority Data

Nov. 22, 2022 (CN) .......................... 202211467096.3

(51) Int. Cl.
*C04B 18/08* (2006.01)
*C04B 20/06* (2006.01)

(52) U.S. Cl.
CPC ............ *C04B 18/08* (2013.01); *C04B 20/068* (2013.01)

(58) Field of Classification Search
CPC .............................. C04B 18/08; C04B 20/068
See application file for complete search history.

(56) References Cited

FOREIGN PATENT DOCUMENTS

| CN | 102850078 A | * | 1/2013 |
| CN | 106220234 A | * | 12/2016 |

\* cited by examiner

*Primary Examiner* — Anthony J Green
(74) *Attorney, Agent, or Firm* — Georgi Korobanov

(57) ABSTRACT

The present disclosure provides a preparation method for hydrothermal synthesis of fly ash silicate aggregate including: mixing sodium metasilicate, potassium hydroxide, and inorganic-organic hybrid excitation monomer as raw materials to obtain an inorganic-organic composite activator; preparing a silicate aggregate raw material, mixing measured fly ash, carbide slag, quicklime, and vitrified micro bubble by mass, adding the inorganic-organic composite activator and continue stirring to produce a mixture; forming a ball disc, wetting an expanded perlite that forms a core of the ball by spraying water, adding a prepared mixture, spraying water while adding, standing and curing, performing a maturation and activation treatment in an autoclave, undergoing a silicon calcium reaction for a hydrothermal synthesis to obtain the silicate aggregates. The present disclosure obtains silicate aggregates with high-performance by accelerating an internal activity of fly ash at an early stage and fully activating the activity of fly ash in all process.

8 Claims, 1 Drawing Sheet

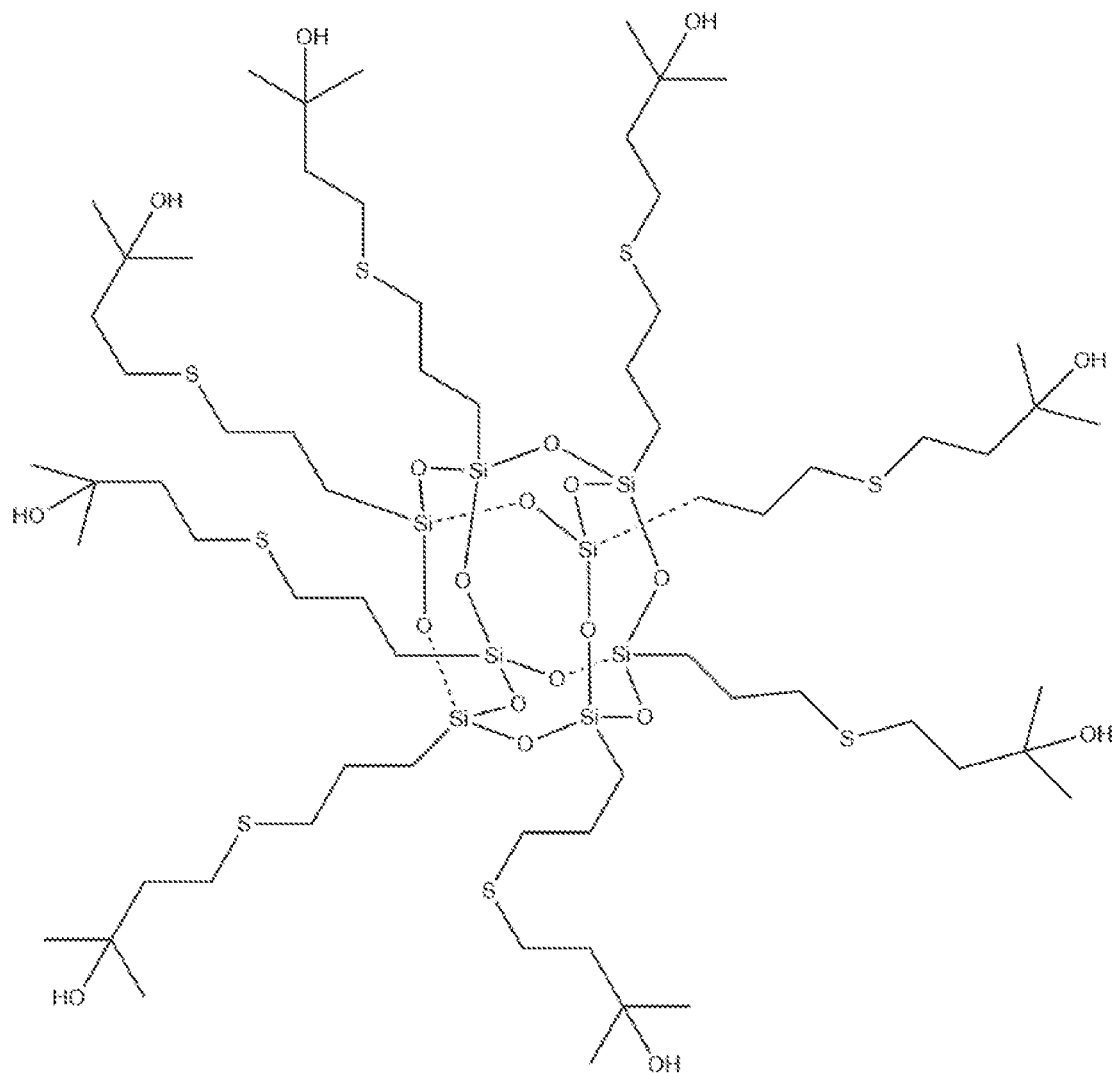

… … …

PREPARATION METHOD FOR HYDROTHERMAL SYNTHESIS OF FLY ASH SILICATE AGGREGATE

CROSS-REFERENCE TO RELATED APPLICATIONS

This application claims priority to Chinese Patent Application No. 202211467096.3, filed on Nov. 22, 2022, which is hereby incorporated by reference in its entirety.

TECHNICAL FIELD

The present disclosure relates to the field of hydrothermal synthesis of silicate aggregate technologies, and in particular, to a preparation method for hydrothermal synthesis of fly ash silicate aggregate.

BACKGROUND

Artificial synthetic aggregates have advantages of low density, high cylindrical compress strength, low water absorption, and good frost resistance. Their products are widely used in construction, bridges, thermal insulation, sound absorption, and other engineering projects. Traditional artificial lightweight aggregates are mainly made of sintered ceramic particles, which are divided into ultra-light ceramic particles, ordinary ceramic particles, and high-strength ceramic particles based on their bulk density and cylindrical compress strength. With the improvement of equipment level, technological progress, and the influence of national environmental protection policies, the research, development, and application of non-sintered artificial lightweight aggregates will enter a new rapid development stage.

Hydrothermal synthesized silicate aggregate is an artificially synthesized aggregate proposed based on a method of autoclave curing and hardening. The specific research results are as follows: on the one hand, under a curing condition: wet carbide slag of 37.5% to 43.4%, temperature of 180° C., and pressure of 1 MPa, and an artificial lightweight aggregate with a cylindrical compress strength of 4 to 6 MPa which is higher than commercially available ceramic particles, a bulk density of less than 900 kg/m³, and an apparent density of less than 1800 kg/m3 has been developed; on the other hand, based on a saturated steam autoclave curing process with a temperature of 180° C. and a pressure of 1.0 Ma, effects of different mineral types of siliceous materials and fly ash on the properties of epoxy propane slag shell ceramic particles and concrete were studied. A developed coarse aggregate was used to prepare a cubic lightweight aggregate concrete with a cylindrical compress strength up to 81.5 MPa; and through research, it has been shown that, under a condition that the matrix being the same, artificial silicate aggregate was used to replace ordinary crushed stone with an equal volume and an artificial silicate aggregate concrete with a compress strength of 28 d that is equivalent to an ordinary concrete can be prepared, but its bulk density is about 20.5% lower than the ordinary concrete.

At present, industrial solid waste such as fly ash can always be used as a concrete admixture. However, due to the disadvantage of low activity strength of fly ash at an early stage; thus, the present disclosure provides a preparation method for hydrothermal synthesis of fly ash silicate aggregate that accelerates an internal activity of fly ash at the early stage and can fully active the activity of fly ash in all stages.

SUMMARY

In order to fully activate the activity of fly ash in all stages, the present disclosure provides a preparation method for hydrothermal synthesis of fly ash silicate aggregate. Firstly, an inorganic-organic composite activator is prepared, which can play a role of full activating the activity of fly ash, potassium hydroxide and sodium metasilicate are used as an inorganic component to mainly activate the activity of fly ash at an early age, and promote a fracture of Si—O and Al—O bonds on a surface of fly ash particle to form an unsaturated bond, and an inorganic-organic hybrid excitation monomer is used (octahydroxy terminated POSS (polyhedral oligomeric silsesquioxane)) as an inorganic-organic hybrid component to further active the activity of fly ash in a later hydration stage by slowly releasing OH—.

The present disclosure provides a preparation method for hydrothermal synthesis of fly ash silicate aggregate, including the following steps:

preparing an inorganic-organic composite activator, and a preparation method thereof is as follows:

preparing an inorganic-organic hybrid excitation monomer, the inorganic-organic hybrid excitation monomer is prepared by a thiol-alkenyl chemical reaction between a thiol group of cage type of octathiol polysilsesquioxane (POSS-SH$_8$) and an alkenyl group of butenol monomer, a specific preparation is as follows: adding cage type of octathiol polysilsesquioxane (POSS-SH$_8$), butenol monomer, and tetrahydrofuran to a reactor, after stirring and dissolving, adding a photoinitiator, and stirring and reacting under UV light irradiation with a wavelength of 365 nm, conducting a reaction in a dark room, concentrating a reaction solution, precipitating, and vacuum drying to constant weight to obtain the inorganic-organic hybrid excitation monomer;

where, the butenol monomer is one or a combination of 2-methyl-3-buten-2-ol, 2,3-dimethyl-3-buten-2-ol, 3-methyl-3-buten-2-ol, and 3-buten-2-ol;

the photoinitiator is one of photoinitiator DMPA, photoinitiator 1173, photoinitiator 1907, photoinitiator 369, and photoinitiator 2959;

weighing 1 to 2 parts by weight of sodium metasilicate, 2 to 10 parts by weight of potassium hydroxide, and 0.3 to 1.5 parts by weight of the inorganic-organic hybrid excitation monomer to obtain the inorganic-organic composite activator;

preparing a silicate aggregate raw material, which includes: fly ash 55% to 75%, carbide slag 15% to 25%, quicklime 10% to 20%, expanded perlite 3% to 5%, vitrified micro bubble 0.55% to 1.50%, inorganic-organic composite activator 0.05 to 0.2% by mass;

where, the expanded perlite has a particle size of 0.5 to 1 mm;

mixing the measured fly ash, carbide slag, quicklime, and vitrified micro bubble according to the mass ratio for 1 to 10 minutes, adding the inorganic-organic composite activator, and continue stirring for 1 to 5 minutes to prepare a mixture;

forming a ball disc, wetting the expanded perlite that forms a core of the ball by spraying water, adding a prepared mixture, spraying water while adding, the ball disc has a diameter of 5 mm to 10 mm, standing and curing for 1 to 3 hours, performing a maturation and activation treatment under an autoclave curing condition: a temperature of 160 to 200° C. and a pressure of 1 to 1.3 MPa, undergoing a silica calcium reaction for a hydrothermal synthesis to obtain the hydrothermal synthesis silicate aggregate;

where, an optimal process parameter for the autoclave curing condition is: temperature of 180° C. and pressure of 1.15 MPa.

The present disclosure provides a hydrothermal synthesis of fly ash silicate aggregate, which includes: fly ash 55% to 75%, carbide slag 15% to 25%, quicklime 10% to 20%, expanded perlite 3% to 5%, vitrified micro bubble 0.55% to 1.50%, and inorganic-organic composite activator 0.05 to 0.2% by mass ratio; and the hydrothermal synthesis of fly ash silicate aggregate has a specific water absorption of 5.4% to 7.8%, a bulk density of 690 to 730 kg/m$^3$, and a cylinder compressive strength of 10.7 to 18.3 MPa.

Compared with the prior art, the present disclosure has the following beneficial technical effects:

the present disclosure obtains an inorganic-organic composite activator through mixing, in which potassium hydroxide and sodium metasilicate active the activity of fly ash at an early age, which promotes a fracture of Si—O and Al—O bonds on a surface of fly ash particle to form an unsaturated bond. A strong hydration ability of Na facilitates a formation of Si(OH)$_4$ monomer, and K$^+$ can accelerate a condensation and recombination between Si(OH)$_4$ tetrahedra and Al(OH)— tetrahedra, forming more Q4$^4$ structural units in a three-dimensional structure, and react with an active Ca(OH)$_2$ formed in carbide slag to generate gel materials such as hydrated calcium silicate C—S—H and hydrated calcium aluminate C-A-H, while the inorganic-organic hybrid excitation monomer mainly provides OH— to further active the activity of fly ash in a later stage of hydration to generate active Ca(OH)$_2$, and the inorganic-organic hybrid excitation monomer can be filled in a gap of a network framework structure, in which the cage type of POSS structure can improve a strength of the silicate aggregate, and the organic structure extended on POSS can also have a certain improvement effect on a flexibility performance of the silicate aggregate.

Most raw materials used in the present disclosure are gangues and industrial waste, which reduce energy consumption, save energy, reduce environmental pollution during a production process, and a silicate aggregate with high-performance is obtained by preparing.

BRIEF DESCRIPTION OF DRAWINGS

FIG. 1 is a chemical structural formula of an inorganic-organic hybrid excitation monomer.

DESCRIPTION OF EMBODIMENTS

The following will provide a clear and complete description of the technical solution in embodiments of the present disclosure in combination with the embodiment. Obviously, the described embodiments are only a part of the embodiments of the present disclosure, not all of them. Without conflict, embodiments in the present application and the features in the embodiments can be combined with each other. Based on the embodiments in the present disclosure, all other embodiments obtained by ordinary technicians in the art without creative work fall within the protection scope of the present disclosure.

Reagents used in the following embodiments can be purchased from conventional manufacturers in this field; experimental methods used are all conventional experimental methods known to technical personnel in the art.

Embodiment 1

Preparation of a cage type of octathiol polysilsesquioxane (POSS-SH8): weighting 31.8 g of (3-mercaptopropyl) trimethoxysilane and dissolving in 450 mL of methanol solution, adding a methanol mixture solution to a three-port flask equipped with a stirring device, and adding 60 mL of concentrated hydrochloric acid solution at once while stirring, refluxing a mixed solution at 90° C. and stirring for 24 hours, after cooling, firstly standing in an ice water bath and pouring out an upper clear liquid, then dissolving with 10 mL of dichloromethane, adding 250 mL of methanol solution, stirring, and standing in the ice water bath; finally, rotating and distilling at 70° C. and −0.1 MPa to obtain the cage type of octathiol polysilsesquioxane (POSS-SH8);

preparation of an inorganic-organic hybrid excited monomer: 10.2 g of cage type of octathiol polysilsesquioxane (POSS-SH8), 17.3 g of 2-methyl-3-butene-2-ol, and 300 mL of tetrahydrofuran THF were added to a quartz round bottom flask, after stirring and dissolving, photoinitiator DMPA was added. The reaction was stirred under UV light irradiation (UV 365 nm) for 1 hour, and reaction device was covered with a dark cloth to prevent UV light leakage. Reaction solution was concentrated and precipitated with anhydrous ether (having ice), filtering and collecting a product, drying in a vacuum oven at 30° C. for 24 hours to obtain the inorganic-organic hybrid excited monomer, its structural formula is shown in FIG. 1.

Embodiment 2

A preparation method for hydrothermal synthesis of fly ash silicate aggregate, including the following steps:

preparing an inorganic-organic composite activator, which is prepared as follows: weighing 1.5 parts by weight of sodium metasilicate, 5 parts by weight of potassium hydroxide, and 1.5 parts by weight of the inorganic-organic hybrid excitation monomer prepared in Embodiment 1 to obtain the inorganic-organic composite activator; preparing a silicate aggregate raw material, which includes: fly ash 60%, carbide slag 20%, quicklime 15%, expanded perlite 3.85%, vitrified micro bubble 1%, inorganic-organic composite activator 0.15% by mass;

where, chemical composition of fly ash is: 50.16% SiO$_2$, 35.25% Al$_2$O$_3$, 3.85% CaO, 0.36% Na$_2$O, 0.6% MgO, 1.84% K$_2$O, 0.54% SO$_3$, 1.18% TiO$_2$, 1.02% Loss on ignition;

chemical composition of carbide slag is: 60.98% CaO, 5.42% SiO$_2$, 3.0% Al$_2$O$_3$, 0.05% Na$_2$O, 0.28% SO$_3$, 0.19% Fe$_2$O$_3$, 0.75% other, and 29.33% Loss on ignition; the expanded perlite has a particle size of 0.5 mm;

mixing measured fly ash, carbide slag, quicklime, and vitrified micro bubble according to the mass ratio for 5 minutes, adding the inorganic-organic composite activator, and continue stirring for 3 minutes to prepare a mixture;

forming a ball disc, wetting the expanded perlite that forms a core of the ball by spraying water, adding a prepared mixture, spraying water while adding, the ball disc has a diameter within a range of 5 mm to 10 mm; standing and curing for 1 hour, then, performing a maturation and activation treatment in an autoclave and under an autoclave curing condition: a temperature of 180° C. and a pressure of 1.15 MPa; undergoing a silica calcium reaction for a hydrothermal synthesis to produce the hydrothermal synthesis silicate aggregate.

According to GB/T7431.1-2010 "Light Aggregates and Test Methods—Part 1: Light Aggregates", performance tests were conducted. Test results showed that a specific water absorption was 6.2%, a bulk density was 710 kg/m$^3$, and a cylinder compressive strength was 17.5 MPa.

Embodiment 3

A preparation method for hydrothermal synthesis of fly ash silicate aggregate, including the following steps:
preparing an inorganic-organic composite activator, which is prepared as following: weighing 5 parts by weight of potassium hydroxide and 1.5 parts by weight of the inorganic-organic hybrid excitation monomer prepared in Embodiment 1, and mixing to obtain the inorganic-organic composite activator;
preparing a silicate aggregate raw material, which includes: fly ash 60%6, carbide slag 20%, quicklime 15%, expanded perlite 3.85%, vitrified micro bubble 1%, inorganic-organic composite activator 0.15% by mass;
the expanded perlite has a particle size of 0.5 mm;
mixing measured fly ash, carbide slag, quicklime, and vitrified micro bubble according to the mass ratio for 5 minutes, adding the inorganic-organic composite activator, and continue stirring for 3 minutes to prepare a mixture;
forming a ball disc, wetting the expanded perlite that forms a core of the ball by spraying water, adding a prepared mixture, spraying water while adding, the ball disc has a diameter within a range of 5 mm to 10 mm, standing and curing for 1 hour, then, performing a maturation and activation treatment under an autoclave curing condition: a temperature of 180° C. and a pressure of 1.15 MPa; undergoing a silica calcium reaction for a hydrothermal synthesis to produce the hydrothermal synthesis of silicate aggregate.

According to GB/T17431.1-2010 "Light Aggregates and Test Methods—Part 1: Light Aggregates", performance tests were conducted, and results showed that a specific water absorption was 6.9%, a bulk density was 691 kg/m$^3$, and a cylinder compressive strength was 13.9 MPa.

Embodiment 4

A preparation method for hydrothermal synthesis of fly ash silicate aggregate, including the following steps:
preparing an inorganic-organic composite activator, which is prepared as follows: weighing 1.5 parts by weight of sodium metasilicate and 1.5 parts by weight of the inorganic-organic hybrid excitation monomer prepared in Embodiment 1 to prepare the inorganic-organic composite activator;
preparing a silicate aggregate raw material, which includes: fly ash 60%, carbide slag 20%, quicklime 15%, expanded perlite 3.85%, vitrified micro bubble 1%, and inorganic-organic composite activator 0.15%;
the expanded perlite has a particle size of 0.5 mm;
mixing measured fly ash, carbide slag, quicklime, and vitrified micro bubble by mass for 5 minutes, adding the inorganic-organic composite activator, and continue stirring for 3 minutes to prepare a mixture;
forming a ball disc, wetting the expanded perlite that forms a core of the ball by spraying water, adding a prepared mixture, spraying water while adding, the ball disc has a diameter within a range of 5 mm to 10 mm; standing and curing 1 hour, then, performing a maturation and activation treatment under an autoclave curing condition: a temperature of 180° C. and a pressure of 1.15 MPa; undergoing a silica calcium reaction for a hydrothermal synthesis to produce the hydrothermal synthesis of silicate aggregate.

According to GB/T17431.1-2010 "Light Aggregates and Test Methods—Part 1: Light Aggregates", performance tests were conducted, and results showed that a specific water absorption was 7.2%, a bulk density was 689 kg/m$^3$, and a cylinder compressive strength was 14.2 MPa.

Embodiment 5

A preparation method for hydrothermal synthesis of fly ash silicate aggregate, including the following steps:
preparing an inorganic-organic composite activator, a preparation method thereof is as follows: weighing 1.5 parts by weight of potassium hydroxide and 5 parts by weight of potassium hydroxide to obtain the inorganic-organic composite activator;
preparing a silicate aggregates raw material, which includes: fly ash 60/a, carbide slag 20%, quicklime 15%, expanded perlite 3.85%, vitrified micro bubble 1%, and the inorganic-organic composite activator 0.15% by mass;
the expanded perlite has a particle size of 0.5 mm;
mixing measured fly ash, carbide slag, quicklime, and vitrified micro bubble according to the mass ratio for 5 minutes, adding the inorganic-organic composite activator, and continue stirring for 3 minutes to prepare a mixture;
forming a ball disc, wetting the expanded perlite that forms a core of the ball by spraying water, adding a prepared mixture, spraying water while adding, the ball disc has a diameter within a range of 5 mm to 10 mm; standing and curing for 1 hour; then, performing a maturation and activation treatment under an autoclave curing condition: a temperature of 180° C. and a pressure of 1.15 MPa; undergoing a silica calcium reaction for a hydrothermal synthesis to produce the hydrothermal synthesis of silicate aggregate.

According to GB/T17431.1-2010 "Light Aggregates and Test Methods—Part 1: Light Aggregates", performance tests were conducted. Test results showed that a specific water absorption was 7.5%, a bulk density was 662 kg/m$^3$, and a cylinder compressive strength was 11.8 MPa.

For those skilled in the art, it is obvious that the present disclosure is not limited to the details of the above exemplary embodiments and can be implemented in other specific forms without departing from the spirit or basic features of the present disclosure. Therefore, from any perspective, embodiments should be regarded as exemplary and non-restrictive. The scope of the present disclosure is limited by the claims rather than the above description, and therefore aims to include all variations within the meaning and scope of the equivalent elements of the claims within the present disclosure.

What is claimed is:

1. A preparation method for hydrothermal synthesis of fly ash silicate aggregate, comprising the following steps:
preparing an inorganic-organic composite activator, and a preparation method thereof is as follows:

preparing an inorganic-organic hybrid excitation monomer, which is prepared through a thiol-alkenyl chemical reaction between a thiol group of octathiol polysilsesquioxane and an alkenyl group of butenol monomer;

weighing 1 to 2 parts by weight of sodium metasilicate, 2 to 10 parts by weight of potassium hydroxide, and 0.3 to 1.5 parts by weight of inorganic-organic hybrid excitation monomer to obtain the inorganic-organic composite activator;

preparing a silicate aggregate raw material, which comprises: fly ash 55% to 75%, carbide slag 15% to 25%, quicklime 10% to 20%, expanded perlite 3% to 5%, vitrified micro bubble 0.55% to 1.50%, and inorganic-organic composite activator 0.05 to 0.2%;

mixing measured fly ash, carbide slag, quicklime, and vitrified micro bubble, and adding the inorganic-organic composite activator according to the mass ratio to continue stirring to produce a mixture;

forming a ball disc, wetting the expanded perlite that forms a core of the ball by spraying water, adding a prepared mixture, spraying water while adding, standing and curing, performing a maturation and activation treatment in an autoclave, undergoing a silica calcium reaction for a hydrothermal synthesis to obtain the fly ash silicate aggregate.

2. The preparation method for hydrothermal synthesis of fly ash silicate aggregate according to claim 1, wherein the preparation of the inorganic-organic hybrid excitation monomer is as follows: adding octathiol polysilsesquioxane, butenol monomer, and tetrahydrofuran to a reactor, adding a photoinitiator after stirring and dissolving, stirring and reacting under UV light irradiation, and conducting a reaction in a dark room to obtain an inorganic-organic hybrid excited monomer.

3. The preparation method for hydrothermal synthesis of fly ash silicate aggregate according to claim 2, wherein the butanol monomer is one or a combination of 2-methyl-3-buten-2-ol, 2,3-dimethyl-3-buten-2-ol, 3-methyl-3-buten-2-ol, and 3-buten-2-ol.

4. The preparation method for hydrothermal synthesis of fly ash silicate aggregate according to claim 1, wherein the expanded perlite has a particle size of 0.5 to 1 mm.

5. The preparation method for hydrothermal synthesis of fly ash silicate aggregate according to claim 1, wherein the ball disc has a diameter of 5 mm to 10 mm.

6. The preparation method for hydrothermal synthesis of fly ash silicate aggregate according to claim 1, wherein the standing and curing continue for 1 to 3 hours, and the maturation and activation treatment are performed under an autoclave curing condition: a temperature of 160 to 200° C. and a pressure of 1 to 1.3 MPa.

7. A hydrothermal synthesis fly ash silicate aggregate prepared according to the preparation method of claim 1, wherein the fly ash silicate aggregate comprises the following raw materials by weight: fly ash 55% to 75%, carbide slag 15% to 25%, quicklime 10% to 20%, expanded perlite 3% to 5%, vitrified micro bubble 0.55% to 1.50%, and inorganic-organic composite activator 0.05 to 0.2%.

8. The hydrothermal synthesis fly ash silicate aggregate according to claim 7, wherein the silicate aggregate has a specific water absorption of 5.4% to 7.8%, a bulk density of 690 to 730 kg/m$^3$, and a cylindrical compress strength of 10.7 to 18.3 MPa.

* * * * *